May 22, 1962 D. J. COX 3,035,312
COTTON STRIPPER AND SEPARATOR
Filed July 8, 1958 3 Sheets-Sheet 1
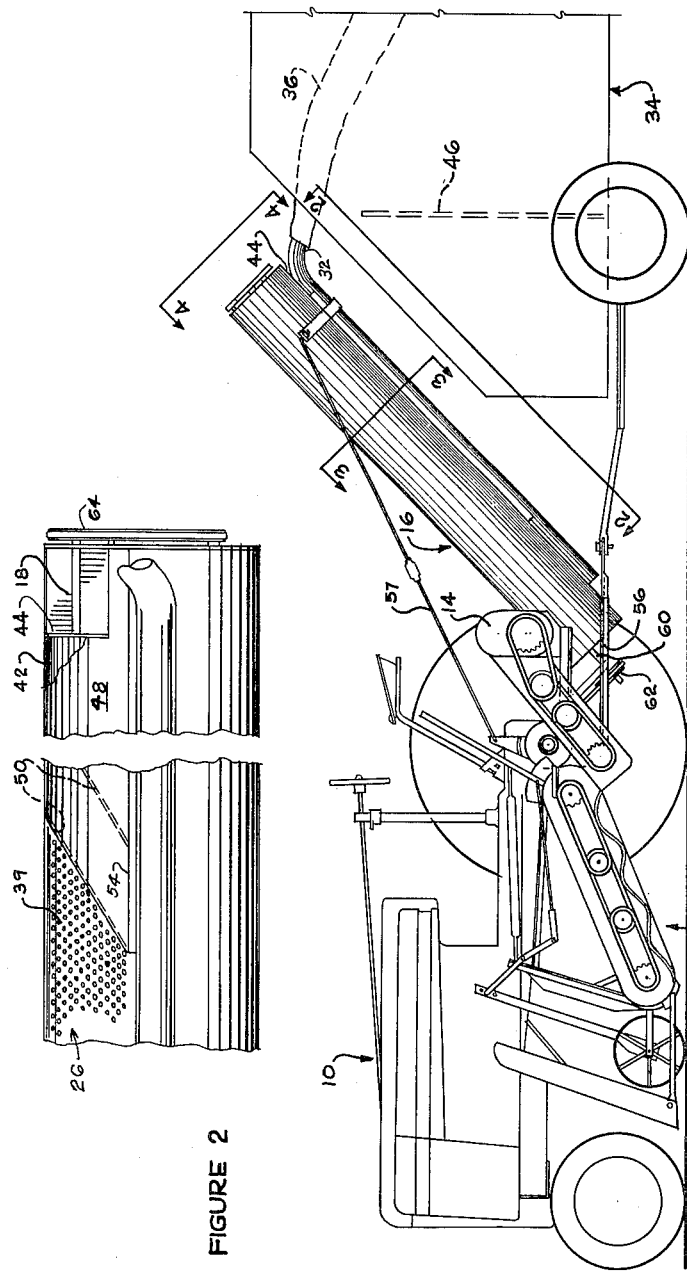
INVENTOR.
DONALD J. COX May 22, 1962 D. J. COX 3,035,312
COTTON STRIPPER AND SEPARATOR
Filed July 8, 1958 3 Sheets-Sheet 2

INVENTOR.
DONALD J. COX

May 22, 1962  D. J. COX  3,035,312
COTTON STRIPPER AND SEPARATOR
Filed July 8, 1958  3 Sheets-Sheet 3
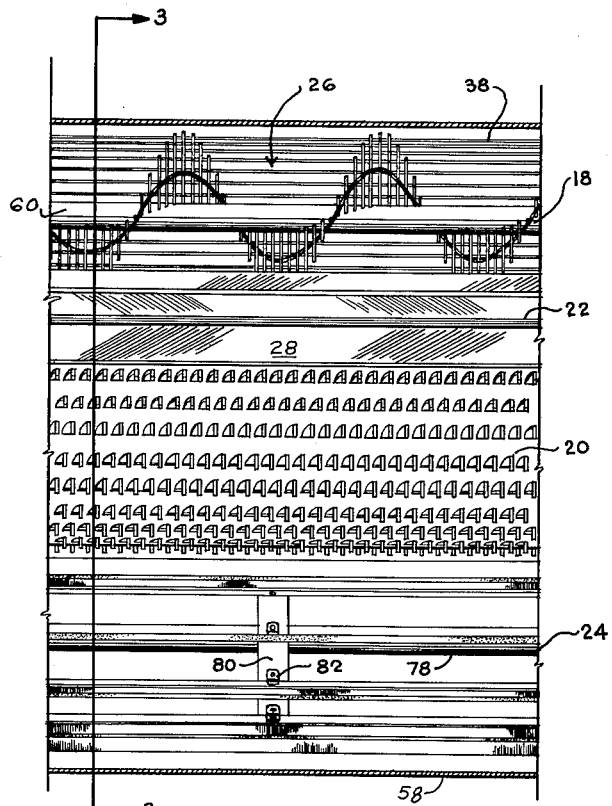
FIGURE 5
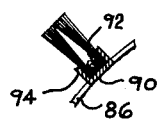
FIGURE 8
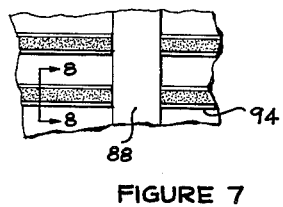
FIGURE 7
FIGURE 6
INVENTOR.
DONALD J. COX
BY United States Patent Office 3,035,312
Patented May 22, 1962

3,035,312
COTTON STRIPPER AND SEPARATOR
Donald J. Cox, Rte. 1, Enochs, Tex.
Filed July 8, 1958, Ser. No. 747,132
13 Claims. (Cl. 19—202)

This invention pertains to stripping cotton from the stalks upon which it grows and separating it from the trash and foreign matter at that time.

A large percentage of the cotton grown is presently harvested by stripping the boll from the stalk after the leaves have been removed naturally by frost or artificially by defoliant or desiccants. Machines presently on the market gather all the cotton, burs, stems, dried leaves, ec. which may be on the stalk. Many attempts have been made to design a machine which would separate much of the burs, trash, limbs and other foreign matter from the cotton after it has been stripped from the stalk.

An object of this invention is to clean cotton after it has been mechanically stripped from the stalk.

Another object is to retain the cotton burs on the soil.

Another object of this invention is to achieve this with a device that is readily mounted upon the same vehicle which carries the cotton stripper in a compact machine.

Further objects are to achieve the above with a device that is sturdy, simple, and reliable yet inexpensive and easy to manufacture.

The specific nature of the invention as well as other objects, uses and advantages thereof will clearly appear from the following description and from the accompanying drawing in which:

FIG. 1 is a side elevation of the vehicle with the stripping mechanism and elevator-cleaner attached thereto. One wheel of the vehicle has been shown removed to expose more of the mechanism.

FIG. 2 is a broken view of the underside of the elevator-cleaner partially cut away, generally taken on line 2—2 of FIG. 1.

FIG. 5 is a longitudinal view of the elevator-cleaner with the top removed to expose the construction, taken on line 5—5 of FIG. 3.

FIG. 6 is a fragmental detail of one form of the saw teeth.

FIG. 7 is a fragmental detail of a modified form of the brush cylinder.

FIG. 8 is a cross section taken on line 8—8 of FIG. 7.

Figure 3:
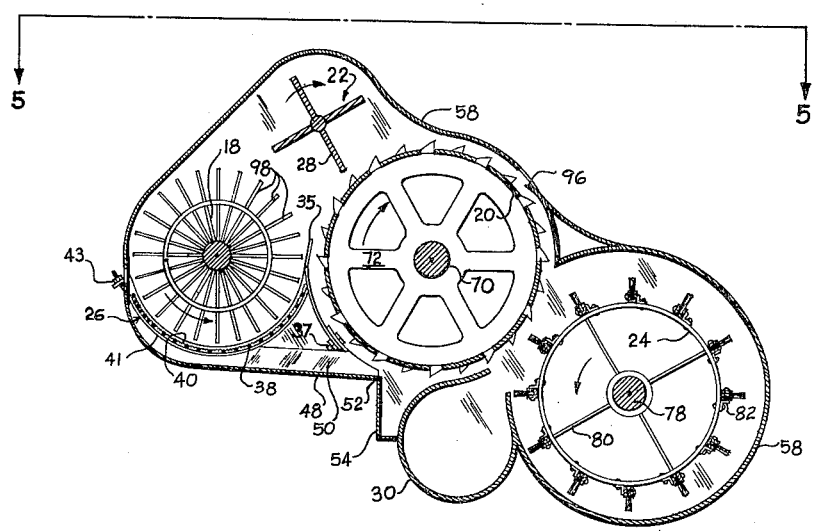
FIG. 3 is an enlarged cross section of the elevator-cleaner, taken on line 3—3 of FIGS. 1 and 5.

As seen in the accompanying drawings, one embodiment of this invention is adapted to be mounted upon a vehicle 10, which in this case is a standard three-wheeled tractor. The stripping mechanism is generally indicated at 12 and as such forms no part of this invention. It may be of any conventional type such as that illustrated in the patent issued to Roscoe, December 12, 1950, No. 2,533,510. The cotton is delivered from the stripper through a system of conveyors to an auger 14 which conveys the cotton from both side strippers to the center of the machine where it is dropped into the elevator-cleaner 16.

It is the construction and mounting of this elevator-cleaner which is novel. As may be seen, it angles upward and rearward from a point below auger 14. There are four parts which rotate about an axis parallel to the axis of the elevator-cleaner. These are elevating auger 18, saw cylinder 20, bur knocker 22, and brush cylinder 24. Each of these cylinders are journaled in bearings upon either end as is customary. The cotton drops from auger 14 into the elevating auger 18. The cotton is carried by the auger in cooperation with trough or auger box 26 upward and rearward. The saw catches the cotton in its teeth and carries it upward and away from the auger. As the cotton passes the bur knocker 22, one of the bars 28 will pass downward adjacent to the saw cylinder and knock any burs which project above the saw cylinder backwards. The direction of the peripheral movement of the bars is opposite the direction the teeth are pointing. This is a standard method of removing cotton burs from the cotton and has proven itself to be quite efficient for this purpose by many years use in cotton gins.

As the cotton is carried on over by the saw cylinder, it reaches the point where it is adjacent to brush cylinder 24. The brush cylinder will have a higher peripheral speed than the saw. For that reason the cotton will be doffed from the saw into the tube 30. As the speed of the brushes will be quite high, they will act as a fan and carry along considerable air with the cotton into the tube 30. Therefore, the cotton will be blown along the tube by the air which is produced by the brush. The tube 30 is closed on its lower end and opened on the upper end 32. At the upper end 32, the tube is not straight but bent in the direction of trailer 34 which is pulled behind the tractor 10.

On the end of the tube 30 there is a pliant hose or fabric tube 36 which extends for considerable distance into the trailer. This prevents the cotton from blowing out of the trailer in high winds as often experienced in the south plains region of Texas. The hose is preferably made of cotton to increase the use of the commodity processed.

The lower end of the trough or auger box 26 is constructed of sheet metal. It has numerous perforations 39 in it so that it is in fact a screen. As there will be a large volume of cotton at the lower end of trough or auger box 26 it is desirable to provide shield 35 (FIG. 3) to prevent an excessive amount from contacting the saw cylinder. The height of this shield is adjustable as the shield is attached by bolts 37. The shield has vertical slots so that it may be adjusted when the bolts are loose and maintained in position by tightening the bolts.

The upper end of the auger box or trough 26 is not made from a solid sheet of metal but is formed by a lattice work which comprises a series of rods 38, which run parallel to the axis of the elevator-cleaner. They are held in place by a number of cross frames 40. At the middle of the elevator-cleaner (i.e. the lower end of the rods) the rods are spaced reasonably close together with only a narrow slot between them. This spacing is so designed that it permits burs and trash to fall through the spacing but is not large enough to permit a boll of cotton to pass therethrough. It is so small that it will not permit a lock of cotton removed from the boll to go through. Toward the top of the elevator-cleaner the spacing of the rods may be increased by adjustment so that there is more space between them, i.e. the slots at the top of the auger box are larger than they are lower down. As the cotton is removed from the auger and the trough 26, there will be less cotton present and more burs and bolls which have not opened. Therefore, it may be desirable to have larger openings so more of the burs may be dropped out at this area. However, the openings are still not great enough to permit an unopened boll of cotton to fall between them. On the upper end of the trough 26 the spacing may be approximately three-quarters of an inch.

Because the size of the bolls, burs, and locks of cotton varies with growing conditions and breed of cotton grown, it is desirable to have the slots between rods 38 of variable width. This is accomplished by scalloping the outer periphery of the arcuate cross frames 40. Then the rods may be spaced as desired at each cross frame. The spacing of the rods, and hence the slots, will not be uniform around the periphery of the trough; however, this is of no consequence and the excess rods may be bunched together as seen on the left side of the trough in FIG. 3. The rods are held radially inward by an outer circumferential band 41. The band has means for tightening which includes adjustment nut 43. To adjust the rods, the various bands 41 are loosened, the rods rearranged in the different scallop spacings in the various cross frames, and the bands tightened again.

Upper end 42 of the trough has opening 44 which permits all material which is remaining in the trough to be dropped into the front of the trailer 34. The trailer is divided by partition 46 into two compartments. The front compartment will receive the unopened bolls, any rocks and other matter which has not fallen through the slots in trough 26. The back compartment will contain the seed cotton. It is desirable that some of the burs should go in with the green bolls which are not opened. It is customary that these bolls are piled in the field until they open. The presence of a certain amount of burs in this pile prevents the green bolls from mildewing or rotting before they open.

The burs and other debris which fall through the slots in the rods fall onto pan 48. This pan conveys the burs to a lower elevation so that they are not excessively scattered by the wind. Also, it provides for a reclaiming process. Although the spacing on the bars is such that a minimum of cotton should fall through, it is inevitable that some should. The plane of the pan is parallel to the axis of the saw cylinder. In a plane normal to the saw, such as FIG. 3, the pan angles downward toward the saw; therefore the burs will slide toward the saw. The movement of the burs is aided by baffles 50 which angle downward and toward the saw. The burs must pass over lip 52 which is near the saw teeth and parallel to the saw axis. If any cotton remains in the burs, it will be snagged by the saw teeth and processed as described above. The burs pass over the lip into chute 54 whereby they pass on down to be discharged on the ground. In this manner they perform a valuable function of retaining a certain amount of the humus matter and plant nutrients which would otherwise be removed from the soil.

Figure 4:
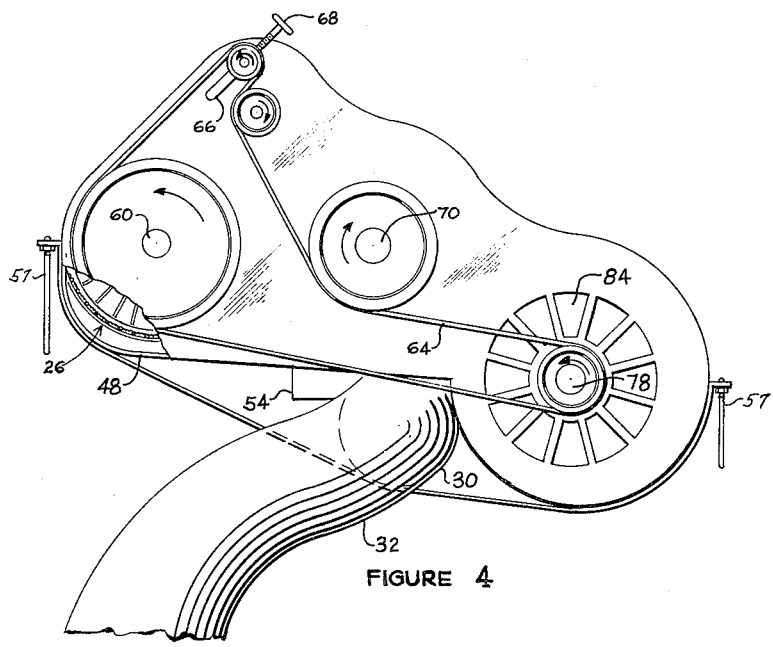
FIG. 4 is an enlarged view of the top of the elevator-cleaner, taken on line 4—4 of FIG. 1.

The elevator-cleaner is carried by the tractor 10 by frame 56 and steadied by guy rods 57 similar to those in conventional use. Housing 58 of the elevator-cleaner itself forms the frame for the unit. Shaft 60 carrying auger 18 extends beyond its bearing and has sheave 62 thereon. This sheave is adapted to be driven by conventional means from the power take-off of the tractor, so that it causes the auger to rotate in the direction shown in FIGS. 3 and 4. Alternately, any of the four shafts may be driven by any conventional means from the tractor. The shafts of all four of the rotating elements extend beyond their bearings on the upper end of the elevator-cleaner, and each of them has a sheave thereon. In this way belt 64 connects the four shafts to be driven in the direction indicated regardless which is the driving shaft and which are driven. An adjustable idler is provided which slides in slot 66 and is adjusted by bolt 68 as is conventional.

It will be understood that although the term, "saw cylinder" is used, the purpose is not to cut anything. Although the teeth of the saw cylinder resemble saw teeth, they are actually picks or spears and the purpose is to pick or entangle the cotton and carry it with them.

In order to save weight the saw cylinder is made by attaching sheet metal cylinder 20 to shaft 70 by spiders 72. The teeth are formed in this cylinder by making two cuts 74 and turning up the triangular portion 76 of metal (FIG. 6). Naturally, conventional saw cylinders as customarily used in cotton gins may be used.

Likewise a conventional cotton gin brush could be used. However, I prefer to make a special lightweight unit which includes shaft 78 and wheels 80. The brushes are attached to the wheels by angle pieces 82. This provides a hollow member so that air may enter ports 84 and travel inside the brush cylinder to the point it is pushed out by the centrifugal action of the brushes acting as vanes. It will be noted that the housing 58 is not circular around the brush but an involute. This provides more air to carry the cotton out tube 30 and hose 36.

A modified brush cylinder may be constructed as indicated in FIGS. 7 and 8. In the modified form sheet metal cylinder 86 is supported as described in connection with the saw cylinder. The cylinder has longitudinal or axial cuts therein. These cuts do not extend the length of the cylinder but are periodically interpreted by band 88 for strength. Adjacent the bands short circumferential cuts are made. Bristles are spread on the center of each land 90, the bristles lying circumferentially. The bristles are clamped in place by bars 92 which are bolted to the lands. Then strips 94 on either side of the lands are bent radially outward, forming a channel with the bristles now clamped in a radial position. Of course, the bristles could be temporarily glued in place until permanently clamped by strips 94, thus eliminating the bars 92. After the construction is complete there will be a series of annular bands 88. Lands 90 will be the undisturbed metal strips extending from one band to the next. Strips 94 will extend radially from the edges of the lands. It is possible to fabricate the bands, lands, and strips from a single sheet of metal by making the cuts described above.

If particularly heavy cotton is being harvested additional vanes may be placed between the brushes on the lower portion of the brush cylinder. This will produce more air at the lower end of tube 30.

By particularly describing brush doffing means, I do not mean to imply that other well known means of doffing, such as air blast, could not be used.

In addition to the rotating knocker 22 with elements 28 in close proximity to the saw cylinder, a stationary element 96 is also used. It is formed by cutting a gap in the housing 58 and bending a strip inward to close proximity and parallel to the saw cylinder. This type element is particularly adapted to remove sticks and limbs entangled in the cotton as it presents an edge to the oncoming cotton and has a surface at a slight angle to a tangent of the saw cylinder surface. It will be noted that the housing slopes downward in a transverse direction so that trash removed by element 96 will slide off the elevator-cleaner onto the ground.

It will be noted that the auger 18 does not have a solid flight but a series of spikes 98 attached to the shaft 60 in a helical fashion.

It will be apparent that the embodiments shown are only exemplary and that various modifications can be made in construction, materials, and arrangement within the scope of the invention as defined in the appended claims.

I claim as my invention:

1. An elevator-cleaner with a longitudinal axis adapted to be operatively associated with and disposed rearwardly of a cotton harvesting or stripping means comprising: the elevator-cleaner mounted with its longitudinal axis angling upward, the elevator-cleaner including means for conveying cotton angling upward generally parallel to said axis; the elevator-cleaner including a saw element with a surface mounted for movement, said saw element having teeth on the surface thereof, the teeth pointed in the direction of movement of the saw elements, some of the teeth proximate the means for conveying, the elevator-cleaner including a knocker element, some of the teeth proximate the knocker element, and the elevator-cleaner including means for doffing cotton from the teeth.

2. An elevator-cleaner adapted to be operatively associated with and disposed rearwardly of a cotton harvesting or stripping means comprising: a saw cylinder mounted within the elevator-cleaner for rotation about its longitudinal axis, the longitudinal axis of said saw cylinder extending upward and rearward from the stripping means, said saw cylinder having a surface thereon, teeth on the surface of the saw cylinder, an auger, said auger mounted for rotation about its axis which is parallel to the saw cylinder, an auger box mounted in the elevator-cleaner partially surrounding the auger, the auger box adjacent the saw cylinder so that the cotton in the auger box may be caught by the teeth of the saw cylinder, the auger box having slots therein so that foreign material may fall therethrough, a burknocker including bars mounted in the elevator-cleaner for rotation about an axis parallel to the saw cylinder, said bars in close proximity to the surface of the saw cylinder, and a brush cylinder mounted in the elevator-cleaner for rotation about its axis which is parallel to the saw cylinder axis, said brush cylinder having a surface with bristles extending therefrom in close proximity to the surface of the saw cylinder so that cotton is doffed from the saw cylinder, and means on the elevator-cleaner for rotating the saw cylinder, auger, burknocker, and brush cylinder.

3. An elevator-cleaner adapted to be operatively associated with and disposed rearwardly of a cotton harvesting or stripping means comprising: a saw cylinder mounted within the elevator-cleaner; the saw cylinder having a surface and a longitudinal axis; the longitudinal axis of the saw cylinder extending upward and rearward from the stripping means; the saw cylinder mounted for rotation about its longitudinal axis; means on the elevator-cleaner for rotating the saw cylinder in one direction; teeth on the surface of said cylinder pointing in that direction of rotation; means on the elevator-cleaner for conveying cotton as stripped upward and rearward along the surface of the saw cylinder so that it may be caught by the teeth; an element mounted in the elevator-cleaner in close proximity to the surface of the saw cylinder for removing foreign matter from cotton caught on the teeth; means mounted in the elevator-cleaner for doffing the cotton from the teeth; and second means within the elevator-cleaner for conveying cotton as doffed upward and rearward in the same direction as the axis of the saw cylinder.

4. The invention as defined in claim 3 wherein said element for removing foreign matter includes bars mounted for rotation about an axis parallel to the axis of said saw cylinder, so arranged and constructed that the foreign matter is knocked back into said means for conveying the cotton as stripped.

5. The invention as defined in claim 3 wherein said element for removing foreign matter includes a stationary strip parallel to the axis of the saw cylinder, said strip having an edge close to the saw cylinder and a surface extending from the edge at a slight angle to a tangent of the saw cylinder surface.

6. The invention as defined in claim 3 wherein said means for conveying cotton as stripped includes an auger and auger box, the auger box having slots therein so that foreign matter may fall through, the axis of the auger being parallel to the axis of the saw cylinder, said auger box having a portion constructed of rods parallel to the axis of said auger, the rods defining said slot, arcuate cross frames attached to the elevator cleaner, said cross frames having scalloped outer peripheries, a band, the rods selectively held along the scalloped side of the cross frames by said band, and means attached to the band for applying circumferential tension to the band; whereby the distance between rods may be adjusted.

7. The invention as defined in claim 3 wherein said means for conveying the cotton as stripped includes an auger and auger box, the auger box having slots therein so that foreign matter may fall through, the axis of the auger being parallel to the axis of the saw cylinder.

8. The invention as defined in claim 7 wherein said slots near the top of the auger box are larger than the slots near the bottom of the auger box.

9. The invention as defined in claim 7 with the addition of a pan attached beneath the auger box, a lip on the pan adjacent and parallel to said saw cylinder, and said pan having means for causing the foreign matter to gravitate toward the saw, whereby any cotton in the foreign matter is reclaimed.

10. The invention as defined in claim 3 wherein said means for doffing comprises an axial shaft having an attached cylindrical shell and bristles arranged radially in the cylindrical shell.

11. The invention as defined in claim 10 wherein said cylindrical shell is constructed of sheet metal, a series of longitudinal lands in said shell, two strips of said sheet metal extending radially outward from each land, forming a channel, and said bristles are clamped within the channel in a radial position.

12. The invention as defined in claim 3 wherein said second means for conveying the cotton as doffed includes means for giving motion to air, a tube on the elevator-cleaner extending upward and rearward, and means on the elevator-cleaner for transmitting said air in motion to the tube whereby the cotton is blown upward and rearward.

13. The invention as defined in claim 12 wherein a hose is attached to the discharge end of the tube.

References Cited in the file of this patent

UNITED STATES PATENTS

| | | |
|---|---|---|
| 353,085 | Sears | Nov. 23, 1886 |
| 423,537 | Todd | Mar. 18, 1890 |
| 991,876 | Murray | May 9, 1911 |
| 1,153,968 | Speck | Sept. 21, 1915 |
| 1,638,867 | Melton | Aug. 16, 1927 |
| 2,001,078 | Court | May 14, 1935 |
| 2,033,081 | Mackenzie | Mar. 4, 1936 |
| 2,049,640 | Conrad | Aug. 4, 1936 |
| 2,064,394 | Thomann | Dec. 15, 1936 |
| 2,123,405 | Court | July 12, 1938 |
| 2,668,330 | Gieszl | Feb. 9, 1954 |
| 2,673,440 | Sawyer et al. | Mar. 30, 1954 |
| 2,680,338 | Space | June 8, 1954 |
| 2,699,637 | Nisbet | Jan. 18, 1955 |
| 2,707,364 | Wagnon | May 3, 1955 |
| 2,760,325 | Witt | Aug. 28, 1956 |
| 2,767,418 | Lombardi | Oct. 23, 1956 |
| 2,790,985 | Harlan | May 7, 1957 |
| 2,807,925 | Andrews | Oct. 1, 1957 |
| 2,844,847 | Smith | July 29, 1958 |
| 2,855,743 | Hubbard | Oct. 14, 1958 |
| 2,862,247 | Vandergriff et al. | Dec. 2, 1958 |
| 2,902,722 | Wallace | Sept. 8, 1959 |